Dec. 22, 1931.  G. K. NEWELL  1,837,474
BACK-UP WHISTLE AND APPLICATION VALVE
Filed Oct. 10, 1930
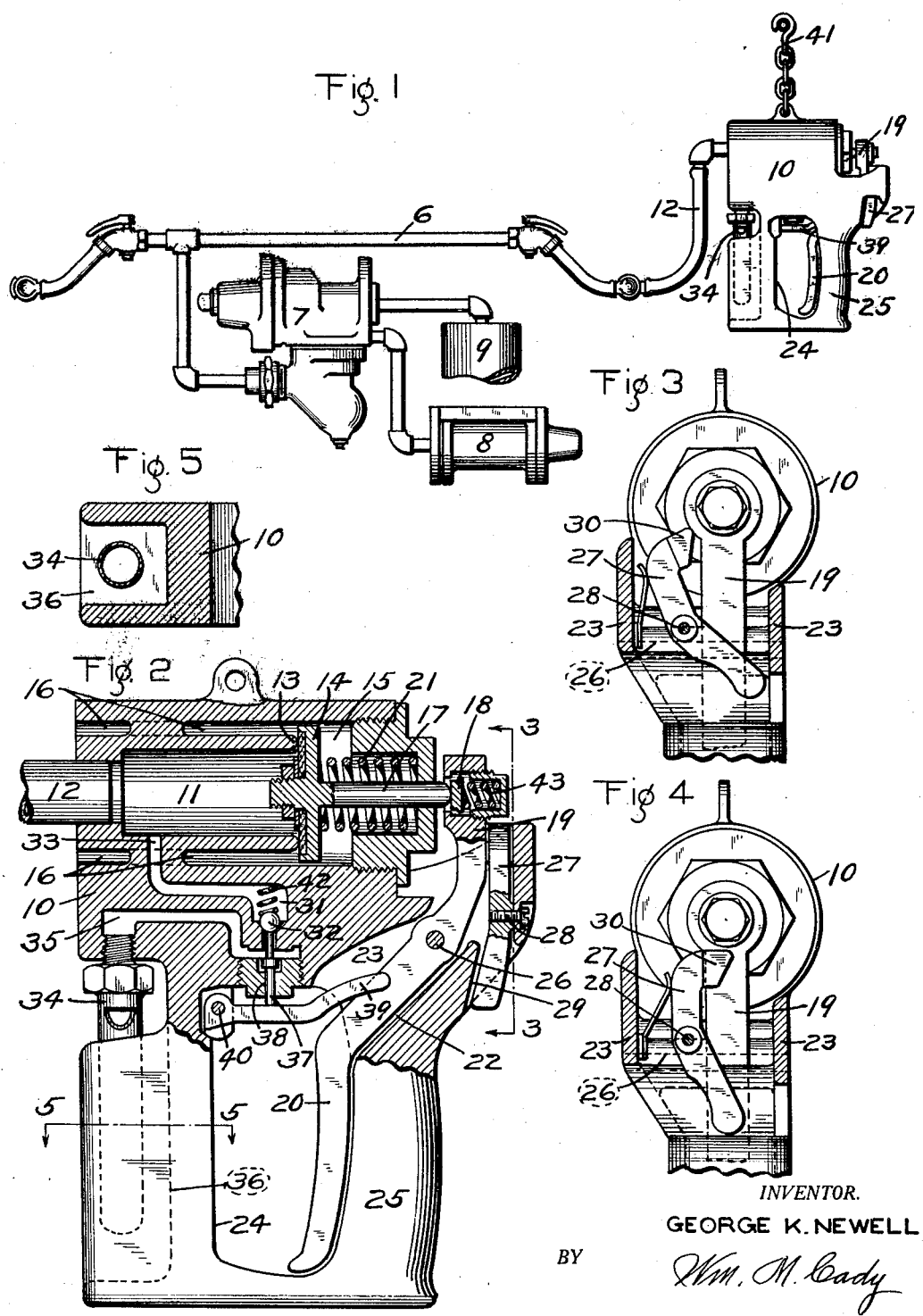
INVENTOR.
GEORGE K. NEWELL
BY Wm. M. Cady
ATTORNEY.

Patented Dec. 22, 1931

1,837,474

UNITED STATES PATENT OFFICE

GEORGE K. NEWELL, OF LEVEL GREEN, PENNSYLVANIA, ASSIGNOR TO THE WESTINGHOUSE AIR BRAKE COMPANY, OF WILMERDING, PENNSYLVANIA, A CORPORATION OF PENNSYLVANIA

BACK UP WHISTLE AND APPLICATION VALVE

Application filed October 10, 1930. Serial No. 487,747.

This invention relates to devices employed on a train in backing up for sounding a warning signal and for effecting an application of the brakes when desired.

An object of the invention is to provide an improved back up whistle and application valve device having separate operating members for operating the warning signal and the brake controlling means, which are so arranged as to be operable at will by one hand of the operator.

Another object of the invention is to provide an improved device of the above character in which means are provided for locking the brake controlling handle in inoperative position.

Another object of the invention is to provide an improved device of the above character in which means are provided for automatically effecting an application of the brakes, should the operator relinquish the operating lever at any time after the lock therefor has been released.

Another object of the invention is to provide an improved back up whistle and application valve device of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing; Figure 1 is a diagrammatic view of a portion of an air brake equipment, showing the application of the invention thereto; Fig. 2 is a side view, partly in section, of the back up whistle and application valve device; Fig. 3 is a vertical section taken on the line 3—3 of Fig. 2 looking at a portion of the end of the device, and showing the latch for the operating handle in the position in which the handle is released; Fig. 4 is a view similar to Fig. 3 showing the operating handle locked by the latch; and Fig. 5 is a horizontal section taken on the line 5—5 of Fig. 2 showing the manner in which the whistle is disposed relative to the casing.

The improved back up whistle and application valve device is adapted to be associated with the usual fluid pressure brake equipment on a vehicle comprising a brake pipe 6, triple valve device 7, brake cylinder 8, and auxiliary reservoir 9.

As shown in Fig. 2, the device may comprise a casing 10 having a chamber 11 connected to the usual back up hose 12 which in turn is connected to the brake pipe 6.

The inner end of the chamber 11 is provided with a seat rib 13 against which is adapted to normally seat a valve 14 contained in a valve chamber 15 which is connected to the atmosphere by passages 16.

The valve 14 has a stem 17 which projects outwardly through an opening in the casing and is engaged by a spring-pressed button 18 carried by the upper short arm 19 of an operating lever 20. Encircling the valve stem 17 and adapted to urge said valve to its seat, is an expansible coil spring 21.

The lever 20 is disposed within a suitable recess or slot 22 formed within the casing 10. The upper portion of the slot 22 is enclosed by opposed side walls 23 formed integrally with the casing, while the lower portion of said slot is made in the form of an elongated opening 24 which extends through the casing.

In front of the opening 24, the body of the casing is shaped to conform somewhat to the handle of a pistol, as indicated at 25, so as to provide a pistol grip for operating the device.

The lever 20 is fulcrumed on a pivot pin 26 carried by the side walls 23 of the casing, and the long arm of the lever is shaped to conform with the contour of the inner edge of the portion 25.

Also disposed in the slot 22 and located in front of the upper portion of the lever 20, in a latch 27, for locking the lever in inoperative position, in which position the valve 14 is held seated, so as to cut off communication from the brake pipe.

As shown, the latch 27 is pivotally mounted on a pin 28 carried by the front of the casing above the portion 25 thereof. The lower portion of the latch 27 projects through an opening 29 and terminates adjacent to the pistol grip portion 25, so as to provide a thumb piece which is conveniently disposed for a thumb of the operator. The upper portion of the latch 27 is provided with a laterally projecting lug or arm 30 which is adapted to engage with the short arm 19 of the lever.

A chamber 31 containing a spring-pressed ball valve 32 is connected to the chamber 11 by a passage 33. The ball 32 is adapted to control communication from chamber 31 to a whistle 34, connected to said chamber by a passage 35. The body of the whistle 34 is disposed in a recess 36 formed in the rear wall of the casing 10 in the manner shown in Figs. 2 and 5. This recess provides means for guarding the whistle against accidental injury.

The ball 32 is adapted to be actuated by a plunger 37 contained in a bore 38, and having its lower projecting end in engagement with a lever 39 pivotally mounted in the casing, as indicated at 40. The lever 39 is disposed adjacent to the upper portion of the opening 24 and projects towards the long arm of the lever 20, the projecting end of said lever 39 being conveniently disposed relatively to the thumb of the operator.

In Fig. 1 the device is shown provided with a hook and chain 41 by means of which it is adapted to be suspended from a portion of the car.

By grasping the pistol grip portion 25 and lever 20 of the device with the right hand, the whistle operating lever 39 and the latch 27 are controlled by the thumb.

In operation, a signal may be sounded by operating the lever 39 with the thumb so that the ball valve 32 is unseated to supply fluid to the whistle 34.

When it is desired to apply the brakes, the latch 27 is shifted by the thumb from the position shown in Fig. 4 to the position shown in Fig. 3. This action releases the lever 20 and the fluid under pressure in chamber 11, acting on the face of the valve 14 forces said valve from its seat. In the outward movement of the valve 14, the upper short arm 19 of the lever 20 is moved outwardly by the valve stem 17, and consequently the lower long arm of the lever 20 is moved inwardly away from the inner face of the pistol grip portion 25.

With the valve 14 unseated, fluid under pressure is vented from the brake pipe to the atmosphere, through the passages 16, so as to effect an application of the brakes in the usual manner.

After the latch 27 has been disengaged, the lever 20 is controlled by the fingers which grasp the lever. The brakes may be gradually applied to effect a service application or a more rapid discharge of air may be effected to cause an emergency application of the brakes, according to the extent that the operator permits the valve 14 to move away from its seat, as determined by the movement of the lever 20 relatively to the hand grip portion 25. Should the grasp be relinquished at any time after the thumb latch 27 is disengaged, an automatic venting of brake pipe pressure will occur since the valve 14 will be opened wide by the force of the fluid in the brake pipe.

The spring 21 of the main valve 14 and the spring 42 of the ball valve 32 may be comparatively light, and should have only sufficient weight to keep the parts in proper position when the device is not in use.

The latch 27 is made positive in action by means of the heavy spring 43, which is of sufficient weight to hold the main valve 14 seated against the maximum brake pipe pressure. In order to engage the latch, the lever 20 must be depressed until the spring 43 is under compression and is carrying all of the force of the main valve.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a brake pipe of a fluid pressure brake system, of a back-up device comprising a valve for controlling the venting of fluid from the brake pipe to effect an application of the brakes, a manually controlled lever for holding said valve closed, the valve being opened upon release of the lever, and a manually controlled member acting on said lever to prevent the opening of said valve upon release of said lever.

2. The combination with a brake pipe of a fluid pressure brake system, of a back-up device comprising a valve subject to brake pipe pressure tending to open the valve for controlling the venting of fluid from the brake pipe to effect an application of the brakes, a manually controlled lever for holding said valve closed, and a manually controlled member acting on said lever to prevent the opening of the valve upon release of the lever.

3. The combination with a back-up hose adapted to be connected to a brake pipe, of a valve device connected to said hose and comprising a casing having a chamber supplied with fluid under pressure from said brake pipe, a valve for venting fluid from the chamber to the atmosphere, means for operating said valve comprising a manually operated lever and a manually operated latch for locking the lever in the position in which the valve is seated, a whistle carried by the casing, a second valve for controlling communication through which fluid under pressure is supplied to said whistle from said chamber, and means for actuating the second valve comprising a manually operable lever.

4. The combination with a back-up hose adapted to be connected to a brake pipe, of a valve device connected to said hose and comprising a casing having a chamber supplied with fluid under pressure from said brake pipe, a valve for controlling communication through which fluid under pressure is vented from said chamber to the atmosphere, a whistle carried by the casing, a second valve for controlling communication through which fluid under pressure is supplied to said whistle from said chamber, means for actuating the first named valve comprising a lever pivotally mounted in the casing, and having a handle portion at one end and a spring-pressed button at the other end for operating the valve to seat the same, and a latch pivotally mounted in the casing, and having a handle portion positioned adjacent to the handle portion of said lever and a portion adapted to engage said lever and lock the same in valve closing position, and means for actuating the second valve comprising a lever pivotally mounted in the casing and having a handle portion positioned adjacent to the handle portion of said first valve operating lever.

5. The combination with a back-up hose adapted to be connected to a brake pipe, of a valve device connected to said hose and comprising a casing having a chamber supplied with fluid under pressure from said brake pipe, a valve for controlling communication through which fluid under pressure is vented from said chamber to the atmosphere, means for actuating said valve comprising a lever mounted in a slot formed in the casing, said lever having a handle portion disposed in an opening through the casing, a spring-pressed button carried by said lever for engaging said valve, a latch for locking the lever in the position in which the valve cuts off communication from the chamber to the atmosphere, said latch having a handle portion positioned adjacent to the handle portion of said lever so as to be engageable by the thumb of the operator, a whistle carried by the casing, a second valve for controlling communication through which fluid under pressure is supplied to said whistle from said chamber and comprising a ball, and means for actuating the ball comprising a plunger and a lever for operating the plunger, said lever having a handle portion positioned adjacent to the handle portion of the first mentioned lever so as to be engageable by the thumb of the operator.

In testimony whereof I have hereunto set my hand, this 7th day of October, 1930.

GEORGE K. NEWELL.

DISCLAIMER 1,837,474.—*George K. Newell*, Level Green, Pa. BACK UP WHISTLE AND APPLICATION VALVE. Patent dated December 22, 1931. Disclaimer filed October 28, 1932, by the assignee, *The Westinghouse Air Brake Company*, the patentee, said *Newell*, concurring and assenting.

Hereby enters this disclaimer to those claims which are in the following words:

"1. The combination with a brake pipe of a fluid pressure brake system, of a back-up device comprising a valve for controlling the venting of fluid from the brake pipe to effect an application of the brakes, a manually controlled lever for holding said valve closed, the valve being opened upon release of the lever, and a manually controlled member acting on said lever to prevent the opening of said valve upon release of said lever.

"2. The combination with a brake pipe of a fluid pressure brake system, of a back-up device comprising a valve subject to brake pipe pressure tending to open the valve for controlling the venting of fluid from the brake pipe to effect an application of the brakes, a manually controlled lever for holding said valve closed, and a manually controlled member acting on said lever to prevent the opening of the valve upon release of the lever."

[*Official Gazette November 22, 1932.*]